US008406415B1

(12) United States Patent  
Lambert

(10) Patent No.: US 8,406,415 B1
(45) Date of Patent: Mar. 26, 2013

(54) PRIVACY MODES IN AN OPEN-AIR MULTI-PORT CONFERENCING DEVICE

(75) Inventor: David Lambert, South Jordan, UT (US)

(73) Assignee: Clearone Communications, Inc., Salt Lake City, UT (US)

( * ) Notice: Subject to any disclaimer, the term of this patent is extended or adjusted under 35 U.S.C. 154(b) by 1422 days.

(21) Appl. No.: 11/963,810

(22) Filed: Dec. 22, 2007

Related U.S. Application Data

(63) Continuation-in-part of application No. 11/686,280, filed on Mar. 14, 2007, now Pat. No. 8,077,857.

(60) Provisional application No. 60/987,754, filed on Nov. 13, 2007, provisional application No. 60/987,360, filed on Nov. 12, 2007.

(51) Int. Cl.
H04M 9/08 (2006.01)

(52) U.S. Cl. .................. 379/406.02; 379/406.12

(58) Field of Classification Search .................. 379/3, 406.01–406.16, 93.21, 379/158, 202.01, 205.01; 370/286–292, 370/260–266; 381/71.1–71.14, 94.1–94.8, 381/119; 455/416, 570
See application file for complete search history.

(56) References Cited

U.S. PATENT DOCUMENTS

| | | | |
|---|---|---|---|
| 4,360,712 A | 11/1982 | Horna | |
| 5,263,020 A | 11/1993 | Yatsuzuka et al. | |
| 5,477,534 A | 12/1995 | Kusano | |
| 5,577,097 A | 11/1996 | Meek | |
| 5,696,819 A | 12/1997 | Suizu et al. | |
| 5,848,146 A | 12/1998 | Slattery | |
| 5,933,495 A | 8/1999 | Oh | |
| 5,937,060 A | 8/1999 | Oh | |
| 6,192,126 B1 | 2/2001 | Koski | |
| 6,212,273 B1 * | 4/2001 | Hemkumar et al. | 379/406.08 |
| 6,321,080 B1 * | 11/2001 | Diethorn | 455/416 |
| 6,434,110 B1 * | 8/2002 | Hemkumar | 370/201 |
| 6,442,272 B1 | 8/2002 | Osovets | |
| 6,459,942 B1 | 10/2002 | Markow et al. | |
| 6,526,140 B1 | 2/2003 | Marchok et al. | |
| 6,654,463 B1 | 11/2003 | Leonidov et al. | |
| 6,738,358 B2 | 5/2004 | Bist et al. | |
| 6,744,884 B1 | 6/2004 | Bjarnason | |
| 6,768,796 B2 | 7/2004 | Lu | |
| 6,868,158 B2 | 3/2005 | Takahashi et al. | |
| 6,937,718 B2 * | 8/2005 | Scholte | 379/388.02 |
| 6,990,194 B2 | 1/2006 | Mikesell et al. | |
| 7,046,794 B2 | 5/2006 | Piket et al. | |
| 7,050,575 B1 | 5/2006 | Romesburg | |
| 7,099,458 B2 | 8/2006 | Piket et al. | |
| 7,529,566 B2 | 5/2009 | Rodman | |
| 7,764,783 B1 | 7/2010 | Pai et al. | |
| 7,912,211 B1 | 3/2011 | Lambert | |
| 8,077,857 B1 | 12/2011 | Lambert | |
| 2002/0061103 A1 | 5/2002 | Pehrsson | |
| 2003/0076947 A1 | 4/2003 | Furuta et al. | |
| 2003/0133565 A1 | 7/2003 | Chang et al. | |
| 2003/0206624 A1 | 11/2003 | Domer et al. | |
| 2004/0028217 A1 | 2/2004 | Ebenezer et al. | |

(Continued)

Primary Examiner — MD S Elahee
Assistant Examiner — Akelaw Teshale
(74) Attorney, Agent, or Firm — TraskBritt, P.C.

(57) ABSTRACT

Conferencing products for conducting a conference between a local and two or more distant parties through an electronic channel, wherein distant party audio is routed to the distant parties to provide full audio. These conferencing products are capable of open-air interaction with participants in the locality of a product. Acoustic echo cancellation is applied, which may be accomplished through a single set of coefficients or by a plurality of coefficients and/or echo cancelers on different incoming audio streams and speaker combinations. Privacy modes are provided, whereby one distant party cannot hear the communications of another distant party; those modes including a coaching mode where the privacy is one-way and a mediation mode where the privacy is two-way. Detailed information on various example embodiments of the inventions are provided in the Detailed Description below, and the inventions are defined by the appended claims.

17 Claims, 10 Drawing Sheets

U.S. PATENT DOCUMENTS

| | | |
|---|---|---|
| 2004/0041902 A1 | 3/2004 | Washington |
| 2004/0190701 A1 | 9/2004 | Biage |
| 2004/0228476 A1* | 11/2004 | Denninghoff ............ 379/428.02 |
| 2005/0286698 A1* | 12/2005 | Bathurst et al. .......... 379/202.01 |
| 2007/0189508 A1 | 8/2007 | Knutson |
| 2008/0291260 A1 | 11/2008 | Dignan et al. |

* cited by examiner

PRIVACY MODES IN AN OPEN-AIR MULTI-PORT CONFERENCING DEVICE

CROSS-REFERENCE TO RELATED APPLICATIONS

This application claims the benefit of U.S. Provisional Patent Application No. 60/987,754, filed Nov. 13, 2007, and U.S. Provisional Patent Application No. 60/987,360, filed Nov. 12, 2007, each of which is incorporated by reference in the entirety. This application is also a continuation-in-part of U.S. patent application Ser. No. 11/686,280, filed Mar. 14, 2007, now U.S. Pat. No. 8,077,857, issued Dec. 13, 2011, the disclosure of which is incorporated by reference in its entirety. In addition, this application shares a common specification with U.S. application Ser. No. 11/963,809 filed Dec. 22, 2007. Further, this application is related to U.S. application Ser. No. 11/963,812 filed Dec. 22, 2007.

BACKGROUND

The claimed systems and methods relate generally to conferencing products that connect a local party to two or more distant parties through electronic channels and provide acoustic echo cancellation of audio transmitted through a product and received again through its microphone, and, more particularly, to conferencing products that are connectable to more than one distant party for conversations with local participants in the open air that can keep the audio from one distant party from being communicated to another distant party.

BRIEF SUMMARY

Disclosed herein are conferencing products for conducting a conference between a local and two or more distant parties through an electronic channel, wherein distant party audio is routed to the distant parties to provide full audio. These conferencing products are capable of open-air interaction with participants in the locality of a product, i.e., a local participant can speak and hear into the open air rather than use a handset or a headset. Acoustic echo cancellation is applied, which may be accomplished through a single set of coefficients or by a plurality of coefficients and/or echo cancelers on different incoming audio streams and speaker combinations. Privacy modes are provided, whereby one distant party cannot hear the communications of another distant party; those modes including a coaching mode where the privacy is one-way and a mediation mode where the privacy is two-way. Detailed information on various example embodiments of the inventions are provided in the Detailed Description below, and the inventions are defined by the appended claims.

Reference will now be made in detail to particular implementations of the various inventions described herein in their various aspects, examples of which are illustrated in the accompanying drawings and in the detailed description below.

DETAILED DESCRIPTION

Conferencing devices are used by many who wish to avoid the constraints imposed by an ordinary telephone. A telephone includes a handset that is placed to a person's face providing for a conversation with a distant party. A telephone handset is generally not usable by more than one person because the earpiece is configured for sound production to an ear in close proximity, and a microphone may also be configured for local sound pickup. A conferencing device, in contrast, permits a conversation with a distant party through open-air communication, i.e., without a handset. Open-air communications are desirable in many situations, for example, where there is more than one local participant to be engaged in a conversation, or where a single person wishes to maintain mobility and the use of both of his or her hands.

Some conferencing devices are of the installation-type, meaning that they are intended to be installed into a room and are not mobile. Portable conference devices, in contrast, are portable and relocatable by a user, permitting his or her to attain the advantages of a conferencing device in virtually any location where a connection to a distant party may be made. Now referring to FIG. 1A, one exemplary conferencing device 1a includes a speaker 4 and a microphone 5 for producing and receiving sounds with a participant 6 in an open-air conversation. Speaker 4 and microphone 5 are ordinarily incorporated in the physical product of device 1a for portability, although the speaker and microphone could also be provided as attachables. Hereinafter it is understood that one speaker or microphone may be replaced with a plurality or an array as will be understood by one of ordinary skill, and that reference to a single speaker or microphone is merely for convenience and simplicity of the discussion proceeding below.

Figure 1A:
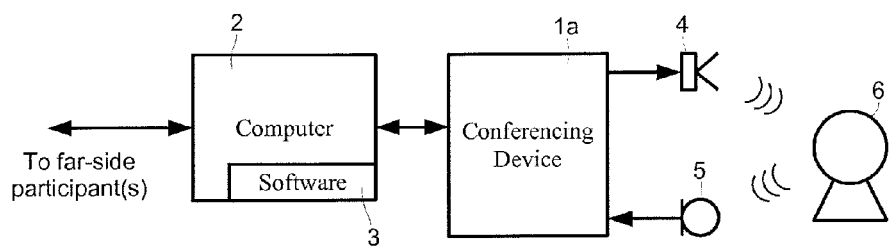
FIG. 1A shows conceptual elements of a basic portable conferencing device connectable to a computer.

The exemplary conferencing device of FIG. 1A is attachable to a computer 2, which provides for a connection with a distant party through software 3. In that example, conferencing device 1a need not include any controls or a display, but rather these are provided on computer 2 by software 3. Software 3 may create a suitable connection with a distant participant by way of a protocol, for example, through VOIP (voice Over Internet Protocol) or instant messaging protocols.

Figure 1B:
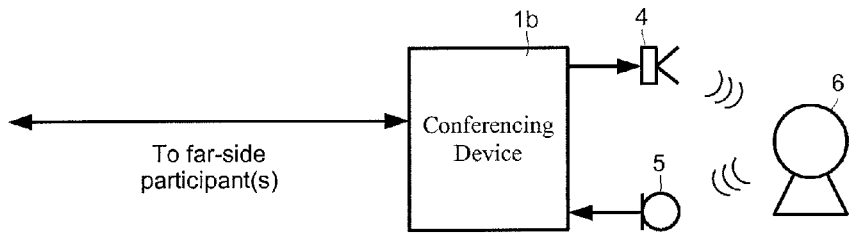
FIG. 1B shows conceptual elements of a basic portable conferencing device that directly connects to a far-side participant.

Alternatively, now looking at FIG. 1B, a conferencing device 1b need not connect to a computer or other device, but may self-manage a connection to a distant participant. For example, conferencing device 1b might be configured to connect to an ordinary POTS telephone network, or might be connectable to a packet-switched network using, for example, Internet Protocol. A conferencing device such as 1b would ordinarily include controls for establishing and disengaging a connection, such as a numeric keypad, volume controls, on/off hook controls, etc.

In an installation-type conferencing system, speakers are ordinarily installed into or onto the ceiling, walls and table top of a conferencing room for wide sound distribution. A portable conferencing device, however, may include only a single speaker located within its housing. There, the sound is directional, i.e., the sound appears to a user to be originating from the portable conferencing product.

Figure 2A:
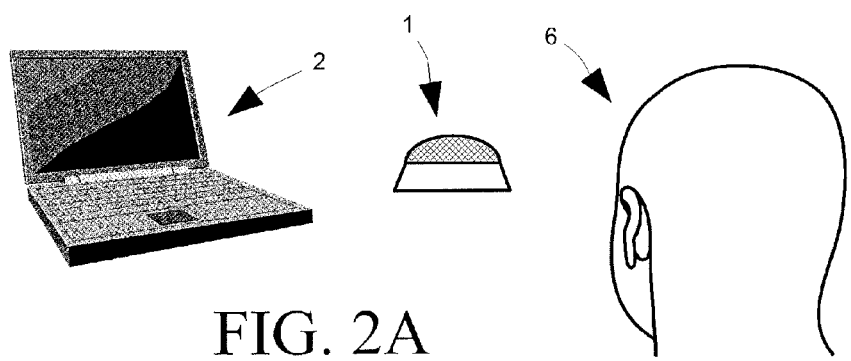
FIG. 2A shows an exemplary orientation of a portable conferencing device, a computer and a user in the course of an audio conversation.

Turning now to FIG. 2A, an ordinary orientation including a portable conference device is now described, using the configuration shown in FIG. 1A. A portable conferencing device 1 is ordinarily placed on a tabletop or near tabletop height, such as by placing on a seat or a shelf if a table is not available. A computer 2, if needed or desired, would typically be placed nearby at about the same height; especially where a computer 2 incorporates a camera for videoconferencing. Where a videoconferencing setup is used, the computer's display may be used to picture a distant participant. In that case, portable conferencing device 1 is preferably placed near the camera, in this example nearby computer 2. This is because a local participant 6 has a natural tendency to look in the direction from which the sound originates, which is ordinarily the conferencing device. Thus, in the orientation shown in FIG. 2A, the participant 6 is not facing directly toward the computer 2 and the image captured in the location of the computer 2 will show the participant at an angle.

In natural conversation, a speaker will look at the person being spoken to for visual cues that the speaker is being heard. One of these visual cues is a recipient looking back at the speaker from time to time. A far-side participant, seeing participant 6 at an angle, may never see participant 6 looking back and may have an impression that he or she is not listening or paying attention. This can be uncomfortable and distracting. This effect is not generally seen in installation-type conferencing systems, because the distant participant's is heard generally throughout the room and with no specific direction; and having no audible sense of the direction of far-side participant representations, the local participants tend to face toward the picture of far-side participants, which is where in most installations the camera is placed.

Figure 2B:
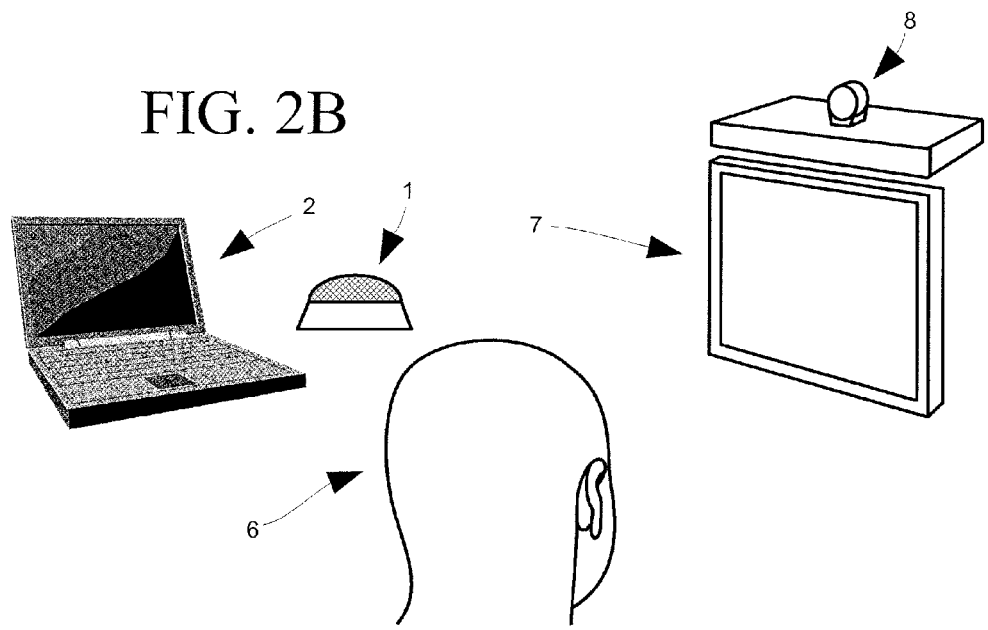
FIG. 2B shows an exemplary orientation of a portable conferencing device, a computer, a display, a camera and a user in the course of a video conversation.

A portable conferencing device, being portable, may be placed in many orientations relative to other conferencing components in a room. In the orientation shown in FIG. 2B, a piece of videoconferencing equipment is provided that is separate from computer 2, that equipment including a display 7 and a camera 8. It may be that the videoconferencing equipment includes audio capabilities, i.e., microphone and speaker. However, a participant 6 may prefer the audio quality of the portable conferencing product 1, which may be enhanced by filtering, noise reduction, echo cancellation, etc. In the orientation shown in FIG. 2B the local participant 6 arrives at a dilemma; if he or she looks in the direction of the conferencing product 1 the camera 8 captures the side of his or her face, while if he or she looks in the direction of the camera 8 his or her voice may not be picked up well at device 1 and he or she may be distracted by the distant sounds heard at the side.

Figure 3A:
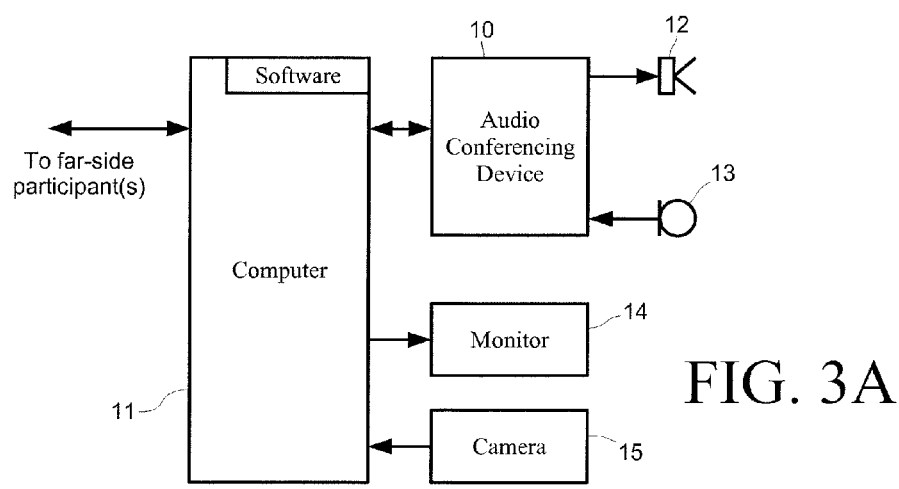
FIG. 3A depicts the elements of an exemplary videoconferencing system having signals routed through a computer.

Now turning to FIG. 3A, a videoconferencing system may be constructed using an audio conference device 10 connected to a processing device such as a computer 11. Device 10 includes a speaker 12 and a microphone 13 for conducting an open-air conversation. In this configuration, a monitor 14 is provided to provide a video display of a conference to local participants, and likewise a camera 15 is provided to capture images of local participants, both being controlled and exchanging data with the computer 11. The computer 11 negotiates a videoconferencing channel carrying a video and an audio stream to far-side participants, using a suitable protocol such as MPEG or that of an instant messenger including video. This configuration is suitable for an installation-type conferencing system, and may also be used in situations where all the components are portable, i.e., for hotel rooms and temporary installations.

Figure 3B:
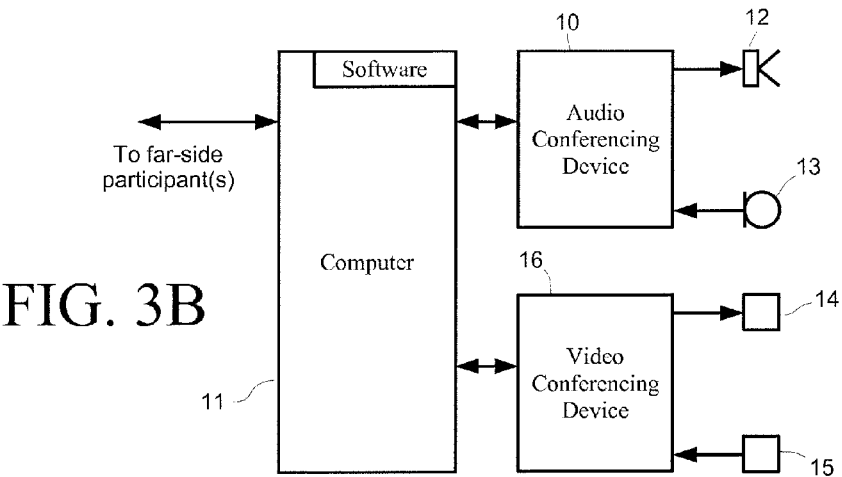
FIG. 3B depicts elements of another exemplary videoconferencing system with a speaker and microphone incorporated in a videoconferencing device.

The system shown in FIG. 3B is similar to that of FIG. 3A, with the addition of a videoconferencing device 16. Videoconferencing device 16 incorporates a display 14 and a camera 15 for conducting a video exchange, in this example through computer 11. These configurations are susceptible to the orientation problems above, where the audio conferencing device 10 is placed at a spatial distance from the display 14 or camera 15. One way to mitigate this problem is to incorporate audio capabilities into a videoconferencing device 16, as discussed above. In that event, audio conferencing device 10 becomes unnecessary or is bypassed, thereby eliminating the benefits that could be provided were it present.

Figure 3C:
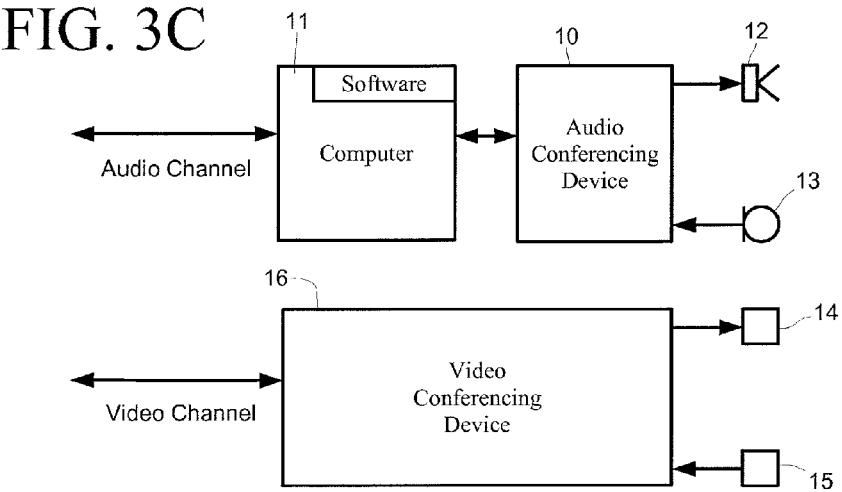
FIG. 3C shows elements of another exemplary videoconferencing system with a videoconferencing device separately connectable from the audio portion of the system.

The configurations of FIGS. 3A and 3B are desirable because computer 11 may synchronize the audio and video streams between the devices. Even so, a videoconferencing system can be implemented as shown in FIG. 3C. There, videoconferencing device 16 is not connected with computer 11, but rather negotiates and maintains its own video channel separately. In that circumstance, videoconferencing device 16 provides no sound capabilities and leaves the orientation problems described above.

Figure 4A:
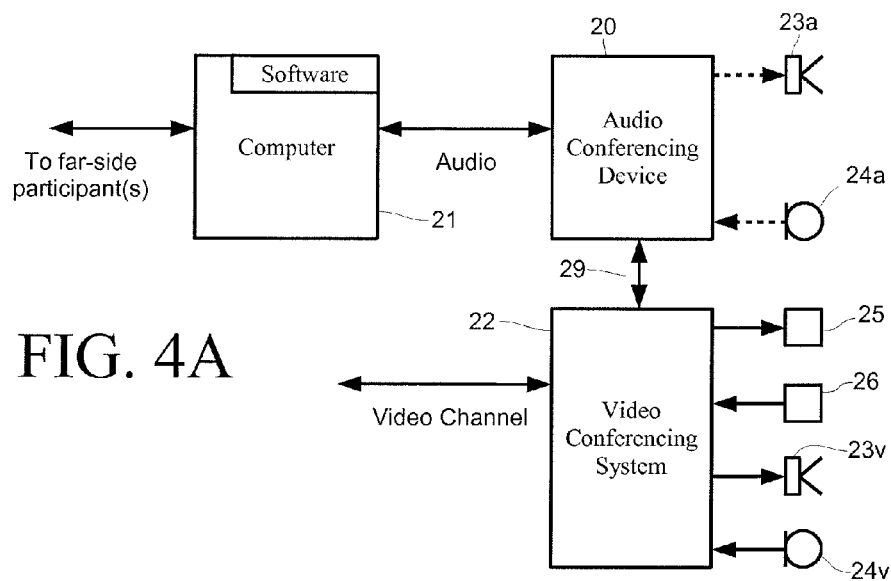
FIG. 4A shows elements of one videoconferencing system with audio interaction between an audio conferencing device and a videoconferencing device.

Referring now to FIG. 4A, another kind of portable conferencing device 20 provides both audio processing and relocation of audio to a display and/or camera. There, audio conferencing device 20 is connectable to a videoconferencing system 22 through an external audio interface 29. Also in the example of FIG. 4A, audio conferencing device 20 is connectable to a computer 21 which initiates and maintains an audio channel to the one or more far-side participants in a conference. Alternatively, audio conferencing device 20 may be configured to maintain an audio channel without any external processing, if desired. Videoconferencing system 22 supplies a video channel, either to a computer 21, another processing device, or directly to distant participants as desired. Videoconferencing system 22 includes a display 25 and a camera 26 to provide bi-directional video. Also in videoconferencing system 22 is a speaker 23*v* and a microphone 24*v* located nearby display 25 and camera 26.

In operation, audio conferencing device 20 disables internal speaker 23*a* and internal microphone 24*a*, thereby eliminating any orientation problems caused by the separation of audio conferencing device 20 from videoconferencing system 22. Audio to and from distant participants, in this example, by way of computer 21, is passed to and from conferencing system 22 through the external audio interface 29. Because the audio signals to and from the videoconferencing system 22 are passed through audio conferencing device 20, device 20 may apply audio processing that is not available at videoconferencing system 22.

Audioconferencing device 20 may be configured in many ways. It may be that external interface 29 includes a detector for detecting when a connection has been made to external equipment; in that case device 20 may automatically disable speaker 23*a* and/or internal microphone 24*a*. Alternatively, device 20 may incorporate controls that select between the internal and external speaker and/or microphone. In yet another alternative, software included in computer 21 may include user inputs for configuration, and audio conferencing device 20 may be configured by the computer 21 through an electronic control interface. Other alternatives may be used in accordance with the desired expectations and circumstances of use.

Figure 4B:
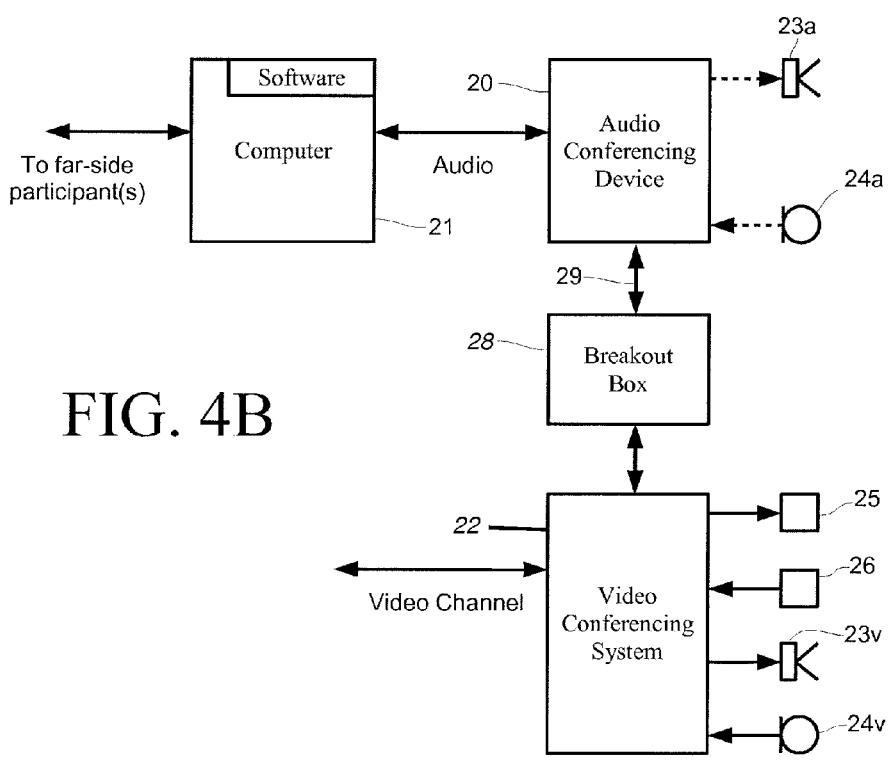
FIG. 4B shows elements of another videoconferencing system with audio interaction between an audio conferencing device and a videoconferencing device through a breakout box.

The example of FIG. 4A is suitable for an installation-type conferencing system, particularly where audio conferencing device 20 is permanent and thereby interface 29 may incorporate fixed wiring to videoconferencing system 22. That configuration may also be used for a portable conferencing device; however, the customary connectors for videoconferencing systems may prescribe several connectors and connector types to be included in interface 29. Now referring to FIG. 4B, an audio conferencing device 20 may include an external audio interface 29 connectable to a breakout box 28 that includes customary connectors. One particular exemplary portable conferencing device 20 is fashioned in a small form factor, small enough to slip into a briefcase or a pocket. There, the provision of a breakout box 28 provides several connectors for the passage of audio signals to external equipment even though the form factor would otherwise be too small.

Additionally, a breakout box 28 provides for a dual-use portable conferencing product that can be conveniently used both at a videoconferencing station and while traveling in an audio-only configuration. Note that although this discussion specifically references a videoconferencing station, breakout box 28 might be connected to another type of conferencing device that does not include video, and this disclosure is not limited thereby. To achieve this dual-use, breakout box 28 is permanently or semi-permanently affixed to or placed in the vicinity of videoconferencing system 22. When it is desired to have a video conference, audio conferencing device 20 is attached to breakout box 28 and any necessary user selections are made for the selection of speakers and microphones. For example, a person may have a videoconferencing system in their office or in a common conferencing room. Audio conferencing device 20 may be left in that room attached to breakout box 28 as videoconferences are needed. From time to time it may be desirable to take audio conferencing device 20 while traveling, leaving the videoconferencing portion behind. A person may separate audio conferencing device 20 from breakout box 28, thereby leaving all connections between the breakout box 28 and a videoconferencing system 22 in place, avoiding a reconnection and potential reinstallation step. That person may then carry device 20 with them, and have audio conferences away from the office. There may be a single connector between device 20 and a cable of interface 29, thereby simplifying the attachment and detachment of device 20 from any permanently affixed system, including breakout box 28.

It may be a videoconferencing device includes only one of a speaker or a microphone, or that either of these is of inadequate quality or is poorly placed. An audio conferencing device having an external audio interface may be configured such that the audio input and the audio output are individually selectable, rather than selectable in tandem. Thus, if a videoconferencing device includes a speaker that produces an inferior sound, or includes no speaker at all, an audio conferencing device may be configured and selected to use its speaker but use a microphone incorporated in the videoconferencing device through an external audio interface. Likewise, it may be that a videoconferencing device to be used includes no microphone, or a microphone that is not properly positioned as in the case where the videoconferencing device is placed at some distant from a local participant. In that case, the audio conferencing device may be configured and selected to use its microphone for outgoing audio but send the incoming audio to the videoconferencing device through the external audio interface. It may also be that an external microphone and/or speaker might be desired to be used that is not incorporated to a videoconferencing device; an external audio interface may separate the audio input from the audio output through the use of separate connectors or by a splitter.

Two-Port Conferencing Devices

Figure 5:
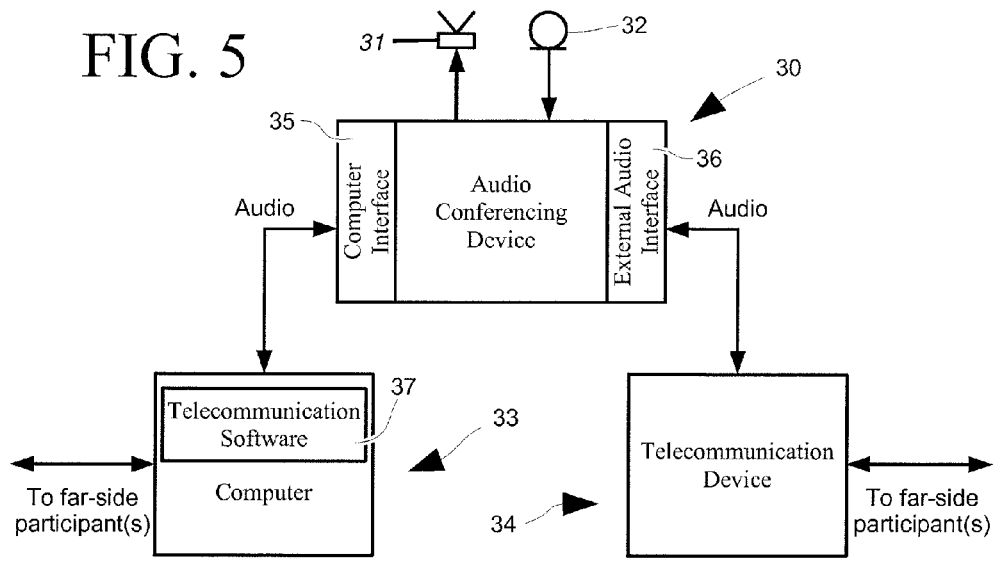
FIG. 5 shows elements of an exemplary audio conferencing device connectable to two far-side participants.

Depicted in FIG. 5 is an audio conferencing device connectable to two far-side participant links Audio conferencing device 30 incorporates a speaker 31 and a microphone 32 for audio interaction with a local participant. Device 30 is connectable to a computer 33, that connection carrying audio information through a computer interface 35. Interface 35 might be through a Universal Serial Bus connection, serial connection, IEEE 1394 connection or other computer connection as desired. Audio information is sent to and from a far-side participant through a data link managed by telecommunication software 37, which could be a Voice Over Internet Protocol (VOIP) link or other protocol or channel as desired. Audio conferencing device 30 also incorporates an external audio interface 36 that connects to a separate telecommunication device 34, which could be, for example, a telephone or a videoconferencing system. The system as shown in FIG. 5 permits a three-way conference between a group of local participants and two groups of far-side participants, each group hearing the speech of the others.

Figure 6:
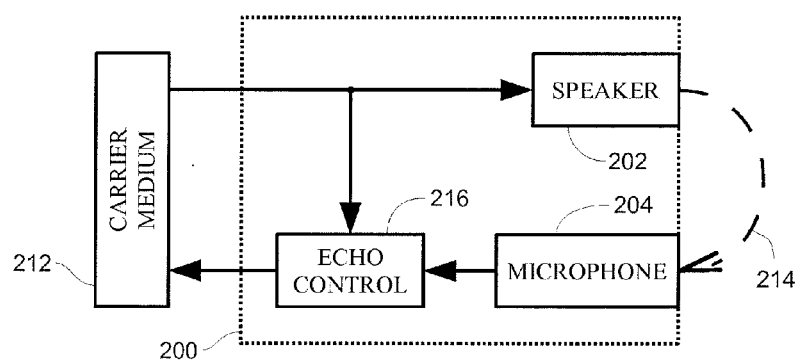
FIG. 6 illustrates elements of an acoustic echo canceler.

An audio conferencing device such as 30 may incorporate acoustic echo cancellation, which is now described with reference to FIG. 6, and simplified for this discussion. A conferencing device 200 is connected to a far-side participant through a carrier medium 212, which might be a telephonic channel, for example. Near-side audio is received at microphone 204 and delivered to the far-side device at times through carrier medium 212. As far-side audio is received, the conferencing device 200 produces audio at speaker 202. The sound produced at speaker 202 is picked up by microphone 204 through a feedback path 214. Thus, the far-side participant will hear an acoustic echo of himself/herself with approximately two-times the carrier medium latency plus feedback path latency, if production of sound received from feedback path 214 is not controlled or cancelled.

Device 200 may include an echo controller 216 for reducing acoustic echo. Standard methods of control include operation at half-duplex, and operation at full-duplex with echo cancellation. Half-duplex operation simply cuts off the sound received at microphone 204 when the audible volume at speaker 202 exceeds a pre-selected threshold. Many conferencing products implement half-duplex operation, however, that operation carries a disadvantage in that participants at only one side of the conference can be heard at any time, and neither side can interrupt or acknowledge the other.

When possible, it is therefore preferable to apply echo cancellation to achieve full-duplex operation. In digital audio systems, echo cancellation can be performed by subtracting off, at echo controller 216, a modified version of the signal produced at speaker 202, leaving only near-side audio. A conceptual method of cancellation merely applies an attenuation and a delay to the outgoing audio, accounting for the delay and attenuation of feedback path 214. However, in the real world, feedback path 214 is complex, including dispersed components from reflections off the several surfaces and persons in proximity to the speaker and microphone.

To deal with that complexity, echo controller 216 ordinarily implements echo cancellation through use of a finite impulse response (FIR) filter, with the received far-side audio signal as input. The FIR filter utilizes a finite number of coefficients of a length sufficient to cover the longest path 214 of significance expected in operation. The reader should recognize that acoustic echoes will be, in general, of longer duration and greater complexity than line echoes. An acoustic echo canceller therefore requires a much larger number of coefficients to provide echo cancellation, which might cover a number of seconds in a device designed for operation in high-echo rooms (i.e, rooms with parallel walls and no carpeting.) These coefficients are applied to a copy of the incoming audio, providing the predicted echo component received at the microphone. The determination of these coefficients is by an iterative method, generally understood by those skilled in the art, and will not be further described here for the sake of brevity. In theory, the FIR coefficients could be determined by the application of a step function to the speaker and a recording of the received audio (in reverse) received at the microphone.

Figure 7:
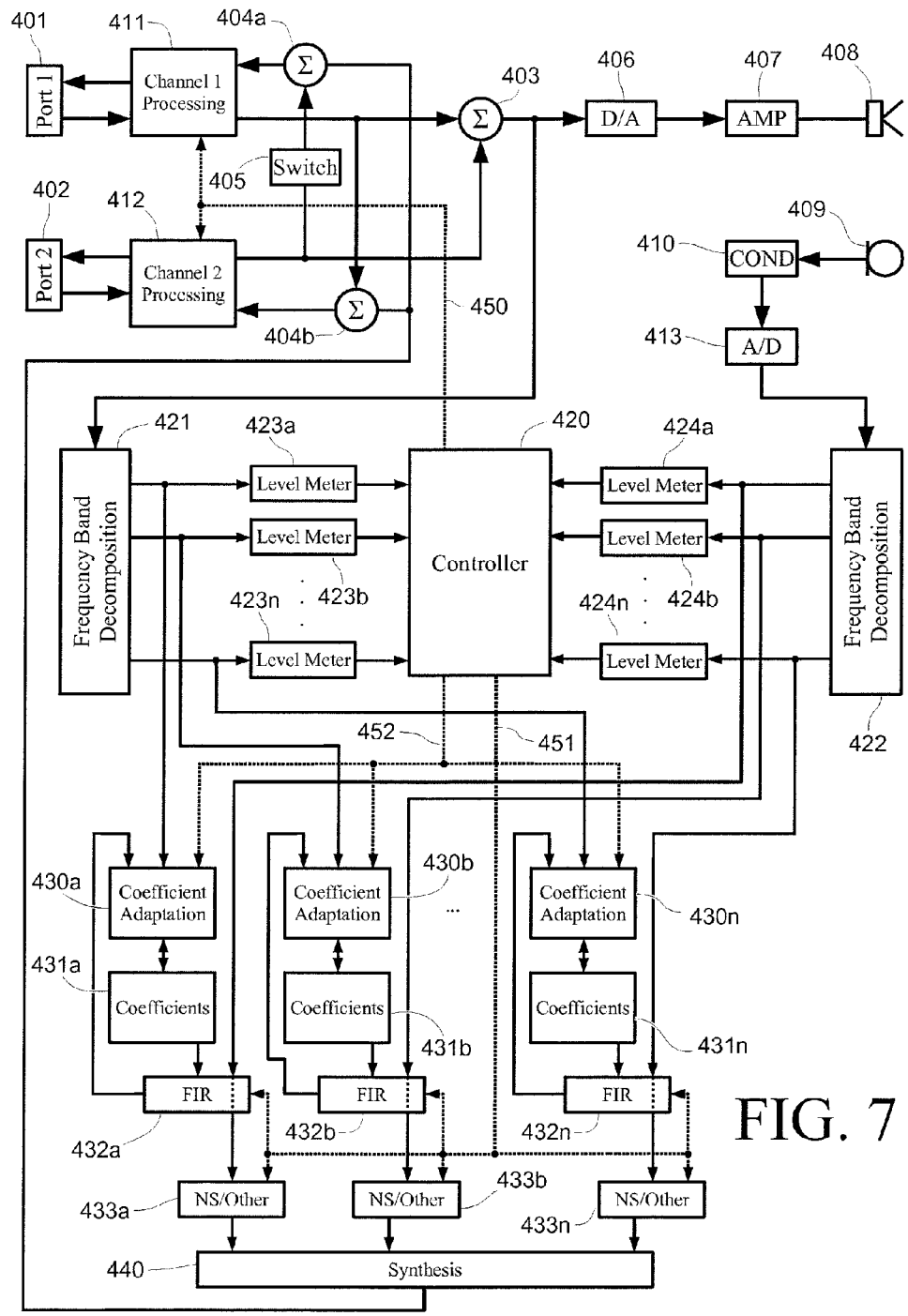
FIG. 7 shows an exemplary audio conferencing architecture having two ports and processing in frequency-band decomposition.

Depicted in FIG. 7 is an architecture for a two-port audio conferencing system utilizing echo cancellation and frequency band decomposition. In this architecture, the conferencing system samples at 16 kHz, and has a main bandwidth of 8 kHz. Wideband audio signals are processed by a decomposer to produce 32 time-domain signals in bands each 250 Hz wide. These bands are sampled at 1 kHz (2× oversampled) from the 16 kHz main signal. The system generally implements for each band an incoming meter, a pre-echo canceller meter, a post-echo canceller meter and an echo canceller.

Continuing in further detail, two audio ports 401 and 402 are included, which are both operable in full duplex. The signals of ports 401 and 402 are processed by processing modules 411 and 412, which may convert and/or condition the incoming signals to and from a digital representation at levels appropriate for signal processing. Incoming audio from both ports 401, 402 is summed together 403 and passed to a speaker 408 by way of a digital-to-analog converter 406 and an amplifier 407. The output of summer 403 is also passed to the echo cancellation section, will be described hereinafter.

The architecture of FIG. 7 implements two frequency band decomposers 421 and 422. One of these operates on the product of summer 403. The other receives an audio signal from a microphone 409 by way of a signal conditioner 410 and an analog-to-digital converter 413. Both frequency band decomposers 421, 422 divide out the incoming signal by frequency into n bands, which are supplied throughout the architecture as shown. A controller 420 controls the adaption of coefficients and certain other functions. Controller 420 receives as input values from level meters 423a-n indicating band volumes present in the audio coming through ports 401 and 402, and from level meters 424a-n indicating band volumes received at microphone 409. Meters 423a-n and 424a-n are analogous to meters 105 and 110 in FIG. 11, respectively.

The remaining processing elements are divided between the n (here 32) bands, including one of a coefficient adaptation module 430a-n operating on coefficients 431a-n particular to a band, a finite impulse filter 432a-n producing echo cancellation, and noise suppression and other processing 433a-n, all of which are recombined into a wideband signal by a frequency synthesis module 440. The wideband output of synthesis module 440 is supplied to processing modules 411 and 412, which potentially results in a signal transmitted through ports 401 and 402.

For each band, an echo canceller is formed by one of adapters 430a-n in conjunction with a set of one set of coefficients 431a-n and a filter 432a-n. The echo cancelling filters 432a-n, noise suppression and other processing 433a-n is controlled in this system by a common control signal 450. Thus, controller 420 can command that half-duplex operation and/or noise suppression operation is enabled, or full-duplex operation with echo cancellation across all bands. Each of adapters 430a-n is controlled by signal 452, thus controlling the adaptation of coefficients 431a-n.

Each coefficient adapter 430a-n takes as input the incoming audio of its band and the potentially echo-cancelled output of its corresponding filter. At times as commanded by controller 420, each of coefficient adapters 430a-n adapts coefficients 431a-n. Those coefficients are made available to FIR echo-cancellation filters 432a-n, which receive as input control signal 451. The output of echo-cancellation filters 432a-n is recirculated to adapters 430a-n regardless of whether echo-cancellation is being applied to the outgoing audio signal, thus enabling coefficient adaptation at any time controller 420 has an indication of far-end singletalk.

Referring back to FIG. 5, an audio conferencing system may be configured in several modes of operation. The first of these modes operates exclusively through the computer interface 35. In this way, a person can conduct a VOIP telephone call through the speaker and microphone, effectively rendering the computer and portable conferencing device into a conferencing telephone. In the second of these modes the device 30 connects through external interface 36 to an analog device, such as a video codec or a headset port on the telephone. This mode also effectively renders the portable conferencing device and the connected device into a speakerphone.

Device 30 can also utilize a third mode in which both ports are active. This mode is referred to as "mix mode." Thus, when the device is being used for telephone conversations, two far-end parties may participate and all parties can hear each other. Now referring back to FIG. 7, in the depicted architecture the summing of incoming audio by summer 403 from both ports 401 and 402 produces mixed audio at speaker 408. Incoming audio from the far-end participants is passed to each other through mixers 404a and 404b. As audio from both far-end parties is now being produced at the speaker, it is desirable to echo cancel the audio of both parties. To achieve that, the incoming audio is summed (or mixed) at mixer 403 and provided to the echo cancellation processing at decomposer 421. This has the effect of echo cancelling the same signal produced at speaker 408. The reader should recognize at this point that the far-end participants can hear each other through the passing of their audio between ports one and two, and further, those participants can not hear each other through the echo between the speaker 408 and microphone 409, if echo cancellation is operable.

The system of FIG. 7 may be configured into another mode similar to mix mode, however, in this mode, a far-end party receives only partial audio. This is accomplished by way of switch 405, which prevents the incoming audio signal from port two as depicted as audio port 402 being passed to the outgoing channel of port one as depicted as audio port 401. In a telephone conversation, control of transmission of local audio is usually controlled by the local participants. For example, in a three-way conversation if one party is not to be heard, that party would press "mute" on their local device. It has not been desired to block the audio between the far-end participants because that interrupts the conference. However with switch 405, it is possible for a local participant who desires to hear comments from a private party to prevent the reception of that audio by a third participant. For example, it may be that a first party wishes to have a telephone conversation with the second party concerning the negotiation for the sale of an item, under conditions where the first party can be coached by a third party. Or in another example, the first party might be providing audio to multiple participants, while being cued to start and stop a broadcast by studio personnel. Conventionally, this would be done through the wearing of an earpiece by the first party, whereby the audible sounds from the third-party would not be picked up at a local microphone. Through use of this mixed mode with partial audio transmission, or simply partial mixed mode, the first participant need not wear an earpiece and gains the advantages that go with a speakerphone.

Or, in another example, a person may wish to have a telephone conversation with another person, while listening to music or a sports broadcast. In the device of FIG. 7, port one (i.e., audio port 401) would be connected to VOIP software, while port two (i.e., audio port 402) is connected to a music producing device such as an MP3 player or a radio. While the conversation is going on, music is produced at speaker 408. However, the far-end participant connected to port one cannot hear the music because it is echo cancelled, provided that switch 405 is logically open.

In a different example, the system of FIG. 7 may be configured to produce generic computer sounds through the USB interface. Port two is connected to a telephone handset port of a telephone, thereby producing a speakerphone. If port two is used in partial mixed mode, sounds produced by the computer, such as error beeps and other audible indications, are not heard at the far end of a conversation.

Switch 405 could be a physical switch, but is preferably a flag or a configuration setting stored in the portable device. Switch 405 may be implemented in software/firmware by either not summing the opposite port of incoming audio with the outgoing audio or merely by substituting a null signal. Switch 405 may physical, electronic, and/or logical and may be implemented in many ways.

In an alternative configuration of the system of FIG. 7, not only is there a switch from port two to port one, but also a switch from port one to port two. This permits an arbitrary selection for which port is to receive partial audio. A separate control for each switch maybe implemented, however, it may feasibly simplify the operation of the device for a user to operate both switches from a common control, or to implement the two switches as a single switch. Such controls or user-selectable inputs may take the form of a physical or manual control on a conferencing product, a software control from a computer, or any other form. Other controls in combination with routing circuitry may provide for disabling an internal microphone or speaker and routing that audio through an external audio interface.

Figure 8A:
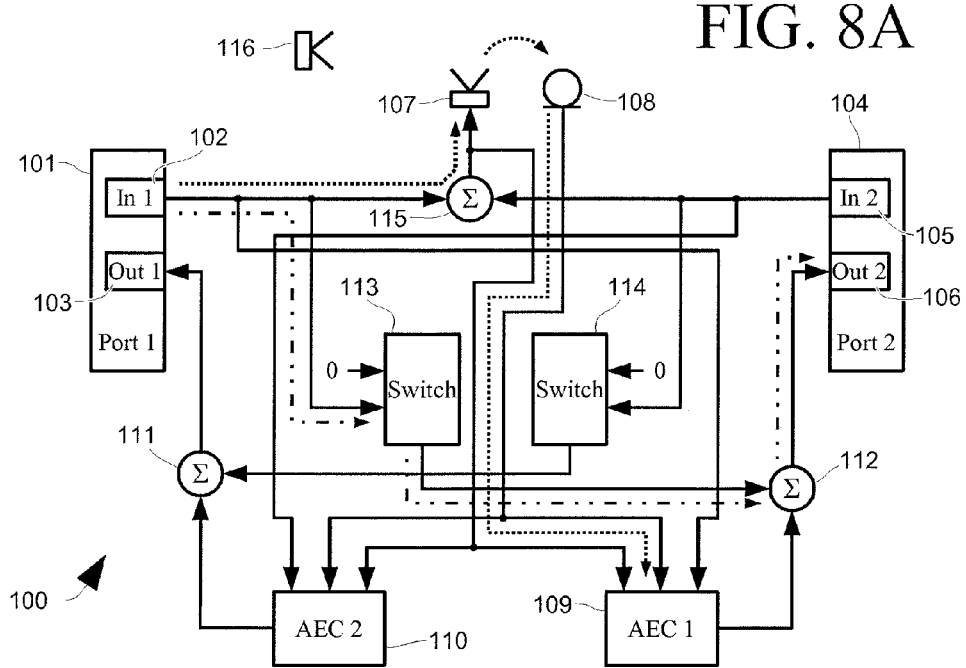
FIG. 8A depicts a two-port audio conferencing architecture configured in a full-audio mode.

A more generic system may be constructed that permits the use of selectively private channels, such as the one depicted in FIG. 8A. In that system 100, two bi-directional ports 101 and 104 are provided, each including an input interface 102 and 105, and an output interface 103 and 106, whereby system audio signals may be communicated to and from distant parties through ports 101 and 104. System 100 implements acoustic echo cancellation for both of inputs 102 and 105, as follows. The audio received from inputs 102 and 105 is summed together 115 for audible production by speaker 107 in the local vicinity of system 100. Some of that audio is picked up by microphone 108, which audio signal is delivered for echo cancellation, and this in example by acoustic echo cancelers 109 and 110. In this system, two echo cancelers are shown to illustrate the use of two sets of coefficients, one set for each port. Thus, should the echo profile be different between ports 101 and 104 as seen by microphone 108, the system can adapt to both profiles. This might occur, for example, where a source of audio apart from speaker 107 is present in the locality of system 100 that is coupled to only one of ports 101 and 104. For example, port 101 might be coupled to a videoconferencing device that has its own speaker 116, in which case an additional echo profile will be present when distant participants are speaking through that videoconferencing device. The use of two or more acoustic echo cancelers is not required; one acoustic echo canceler may be used coupled to a speaker and microphone (or set of those), such as 107 and 108 and can provide acceptable performance if an external audio source such as 116 is not substantially present.

Each acoustic echo canceler 109 and 110 receives as input a signal from its corresponding input port 102 and 105, a signal from microphone 108, and a signal as produced at speaker 107. Adaption of coefficients for each acoustic echo canceler 109, 110 is best performed in the presence of a substantial signal at its corresponding input port, and no signal from other input ports. Additionally, adaption of coefficients is best performed where no local participant is speaking, thereby permitting coefficient convergence mainly on the signal from the corresponding input port. A conversational tracker may be used to identify those times when it is likely that no participant in a conference is speaking other than through the corresponding input port.

After coefficients have adapted, each echo canceler 109 and 110 reduces the perceived coupling between speaker 107 and microphone 108 to that which does not interfere with a conference, and preferably below a level of perception. Mixers 111 and 112 receive the output of echo cancelers 109 and 110 and add, under full-audio conditions, the signal received by the opposing input port 102 or 105. Those mixed signals are provided to distant parties through outputs 103 and 106.

Thus, in the full-audio configuration, a first distant party might be received at port 101 and input 102. Now following the dashed lines, that first distant parties speech passes through summer 115 and is produced at speaker 107 for listening by local participants. That speech is carried through the room to microphone 108, and passes to acoustic echo canceler 110. At this point the signal is modified and/or attenuated by transmission losses between the speaker 107 and microphone 108, but in any event if acoustic echo canceler 110 is operational and adapted then the signal is not carried substantially further in this path, i.e. the signal is reduced in volume to a privacy level sufficiently low that the non-private distant party is not communicated with the contents of the private party's speech, which may be sufficiently low in volume that the non-private party is not even aware of the private party's presence or speech.

To enable other distant parties to hear the first distant party, an additional path is provided as shown by the dashed and dotted line. Beginning with port 101, the first distant participant's audio signal is carried to switch 113, the operation of which will become apparent shortly. From the switch, the audio is carried to mixer 112 and produced at output 106 on port 104. If desired, the signal in this path may be volume-adjusted to match other signals in the system 100 or conversation, however, no processing needs to be done to carry the first participant's speech to other distant parties.

In a system, as shown in FIG. 8A, it is possible to prevent the speech of a distant party from reaching other distant parties, which is explained in connection with FIG. 8B. In FIG. 8A, switch 113 is reconfigured not only to supply the signal received at input 102, but rather no signal is supplied as represented by the zero. In doing so, the path between input 102 and output 106 is interrupted, and thereby a distant party receiving a signal from output 106 a port 104 does not hear the first distant party provided that echo canceler 110 is well-adapted.

Figure 8B:
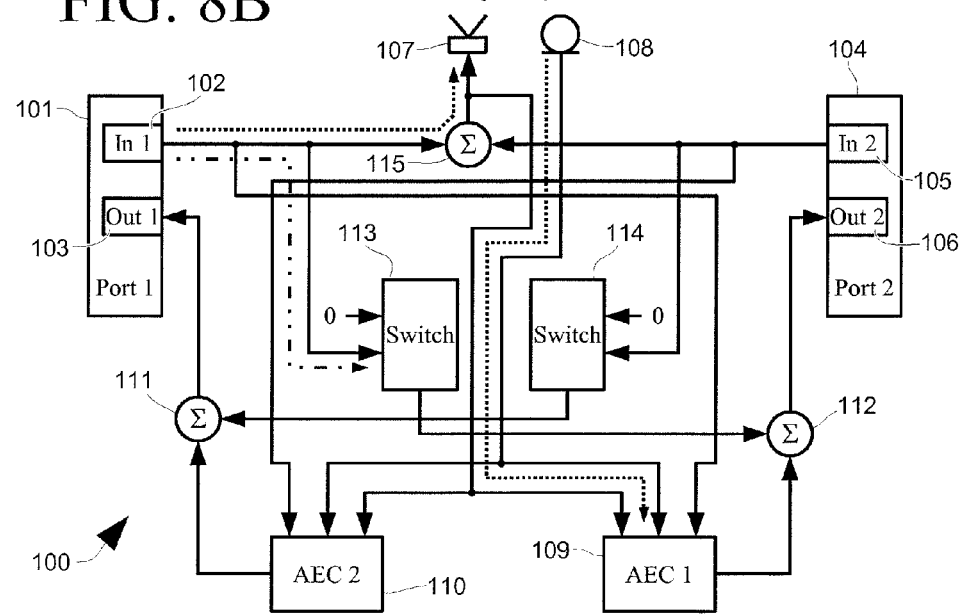
FIG. 8B depicts the two-port audio conferencing architecture of FIG. 8A configured in a partial-audio mode.

Thus, it can be seen that in the conferencing system 100, as configured in FIG. 8B, it is possible to construct a multi-party conference that prevents one party from being heard by another, even though there is an open-air party in the conference. In a configuration where one party's speech is withheld from another party, but not vice-versa, that configuration is referred to herein as a "coaching session," as in the following example. Suppose that a local party desires to have a negotiation with a distant party with the advice and/or counsel of a coaching party without the distant party's awareness. The local party could make a connection with the coaching party first through port 101, and conduct a short conversation or other audio activity to allow echo canceler 110 to adapt, which the coaching party can determine when he or she can no longer hear an echo of himself/herself. At that time, the local party can connect to the distant party through port 104 and begin negotiations. As that negotiation takes place, the distant party and the local party can converse normally through speaker 107, microphone 108 and port 104. The coaching party hears both sides of this conversation, and his or her speech is produced at speaker 107 for the local participant's benefit, but is not transmitted through port 104 to the distant party.

This system and method of initiating and conducting a single private-party conference is not only useful for coaching negotiations, but also in other circumstances. For example, it may be that the private party is to be a witness to the conversation. For example, a distant party might make certain statements against his or her interest if he or she is not aware that the private party is listening. In another circumstance, the private party might act in a supervisory role, for example, in training exercises for the local participant. For example, the local participant might be a telephone sales representative undergoing on-the-job training. A supervisor may act as a private party and walk the local representative through conversations with customers and/or reminders of items that the local representative might forget. In yet another circumstance, a private party might be an angry person that cannot have an effective conversation with the distant party. In that example, the local participant may act as a private party's representative to the non-private distant party. For example, the private party might be a victim of the non-private party, and were the two to engage in a conversation, it might be that the victim could not restrain himself/herself from shouting at the other party. In that example, the local representative party may act as a buffer between the two distant parties whereby a non-emotional conversation may be conducted.

The system 100 as shown in FIGS. 8A and 8B can also be configured to have single private-party conferences by configuring both switches 113 and 114 to interrupt the passage of distant-party speech. In that configuration, the local participant can still hear and speak to both parties through speaker 107 and microphone 108, but neither distant party can speak to or hear the other. This type of configuration is referred to as "mediation mode," as in one sense it is useful to provide mediation between distant parties. For example, it may be that both distant parties are hostile to one another and are not capable of engaging in productive conversation with each other. A local participant may act as a go-between the two parties, communicating that information between them that is useful for progression in a negotiation and withholding other information that he or she deems not productive, and otherwise acting as a mediator. Conducting such a conference between two private parties allows for almost instantaneous progress in negotiation, which is not possible were the local mediating party to engage in a succession of alternating telephone conversations with the adverse parties individually.

In an alternative configuration, the cross-routing of audio to distant parties is not done on a conferencing device by switches (such as switches 113 and 114), but is rather performed in software on a computer connected to the conferencing device. That software may include user-selectable elements, such as checkboxes, buttons or other user interface objects, communicating to the underlying mixing software. In yet another configuration, the conferencing device or a conferencing device and connected computer might connect to a server through a network, for example, a packet-switched or a POTS telephone network. That server contains the mixer and switches for cross-connecting distant participants, and provision is made through the server to select the conversational mode such as full-audio, coaching or mediation modes.

To initiate a mediation conversation the parties will be linked in some order, and thus parties that are linked in earlier might hear the initial speech of a later party until the acoustic echo canceler adapts for that later party. This may be undesirable in certain situations, for example, where the sound of the later-connected party is distressing to an earlier party or where the identity of a later-connected party is to be concealed. A conferencing device capable of private-party participation may be adapted with a mute or other function that prevents the outgoing audio from being transmitted to the earlier-connected parties, or rather simply allow outgoing audio to only the latest-connected party until all connections have been made and adaption has taken place for all parties.

Furthermore, there is no limit to the number of distant parties that might be included in a conversation, provided that the number of ports and switches is equal to or greater than the number of distant groups and/or communication links to distant parties needed. Therefore, the system 100 depicted in FIGS. 8A and 8B that includes two distant ports is merely exemplary and may be expanded as needed. Furthermore, any number of private parties may be selected, either at the beginning of a conference or even while a conference is in progress. For example, a three port device might be configured to have two coaches. In another example, a distant party that continually interrupts can be switched to be private.

Exemplary Product

Figures 9, 10A:
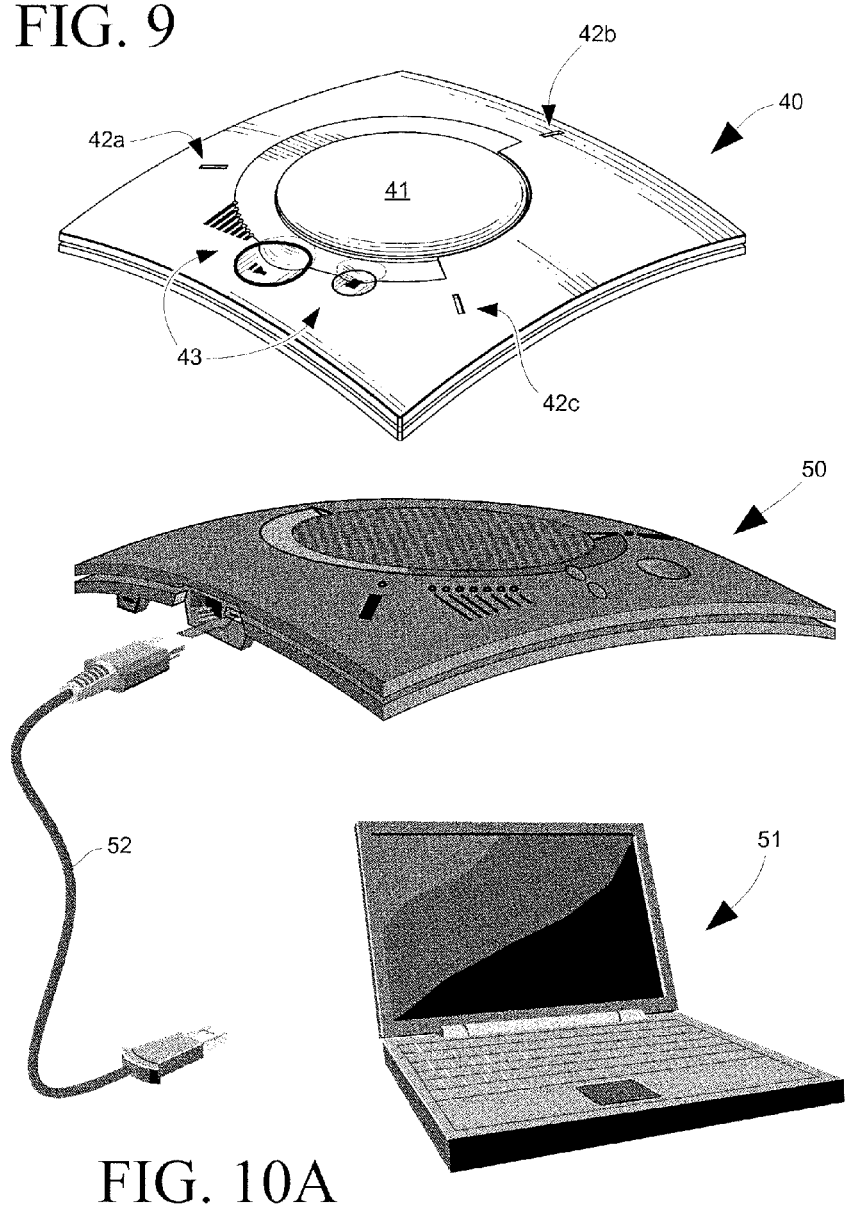
FIG. 9 shows an exemplary form factor of a portable conferencing device.
FIG. 10A depicts the connection of an exemplary portable conferencing device to a laptop computer.

Shown in FIG. 9 is an exemplary form factor for a tabletop portable conferencing device 40, including a speaker 41 and three microphones 42a, 42b and 42c to provide substantially circumferential coverage. Indicators and controls 43 are located to the front on this design, although indicators and controls might easily be duplicated or located elsewhere. The size of this form factor is approximately 4 inches on a side and less than 2 inches high; sufficiently small to slip into a briefcase, computer folio/bag or large pocket.

Now referring to FIG. 10A, and exemplary portable tabletop conferencing product 50 connects to a computer 51 through a USB cable 52. Software on computer 51 establishes an audio connection to a distant party using conferencing device 50 both as an audio input and output device. Conferencing product 50 includes a speaker and microphones for providing audio interaction with local participants, and furthermore includes hardware and firmware for providing audio processing functions including echo cancellation. Conferencing product 50 also includes controls such as volume up/down and mute whereby the product's operation may be controlled.

Figure 10B:
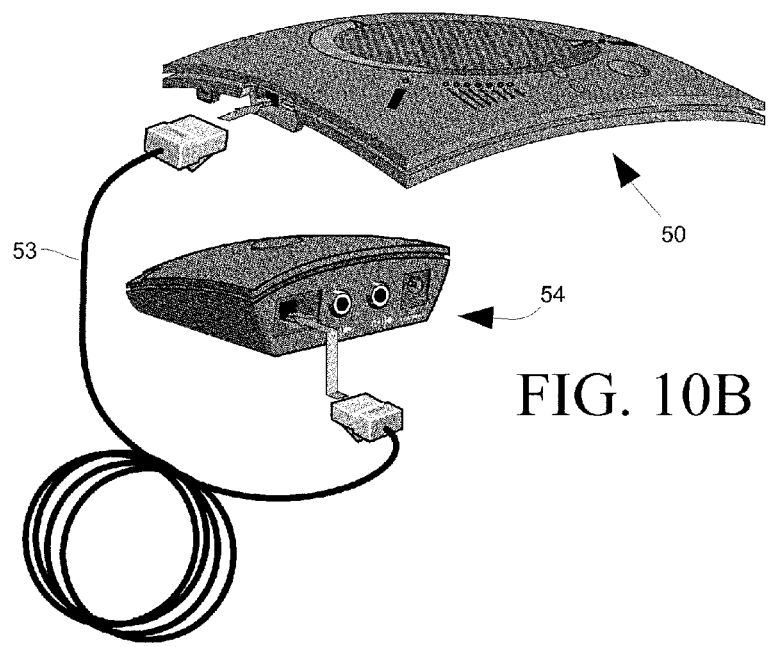
FIG. 10B depicts the connection of the exemplary portable conferencing device to a breakout box.
Figure 10C:
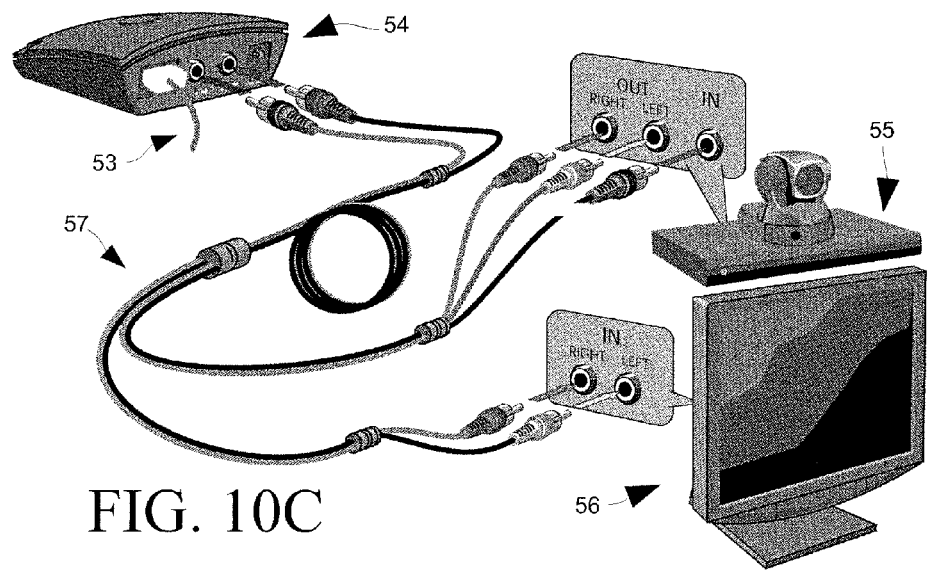
FIG. 10C depicts the connection of the exemplary breakout box to an external conferencing device.

In the configuration shown in FIG. 10A, conferencing product 50 may establish an audio link with one, two, or more distant parties limited by the capabilities of software installed on computer 51. However, this conferencing product 50 includes not only a first USB port, but a second port as well. Now referring to FIG. 10B, conferencing product 50 is connectable to a breakout box 54 by way of cable 53. This breakout box 54 includes connectors for power, audio in and audio out; although not all of those are necessary. Now continuing to FIG. 10C, a patching cable 57 connects to the audio input and audio output on breakout box 54 and on the other cable end connects to an input and output audio device, in this example through the use of RCA-type connectors. The exemplary cable 57 branches to a connector set to a stereo monitor 56 and another connector set to a separate conferencing device 55, which in this figure is a videoconferencing device. The connector set to conferencing device 55 includes a microphone input for local audio received at conferencing device 54, providing for echo cancellation and audio processing at device 54. The connector set to conferencing device 55 also includes audio output for far-side audio received from a distant party connected to device 55. Stereo monitor 56 is provided with full audio while a conference for the benefit of the local participants, may include the audio received from conferencing device 55 and audio from a conferencing connection made through computer 51.

A conferencing product that is used with an internal speaker and microphone or connectable to a single standalone set up only, and for that location microphone and speaker volume levels may be set generally at the time of installation. For a portable conferencing product that might connect to any number of other audio devices, these volume levels may vary from use to use. Thus, a portable device might be connected to a videoconferencing device in the first use and then relocated to a different videoconferencing device in the second. The sensitivity of the microphones and/or speakers to which the conferencing product might be connected to may vary, and in this exemplary product software is provided to save level adjustments. Also, the use of different microphones and/or speakers may be called for, depending on which external device is attached.

Figure 11A:
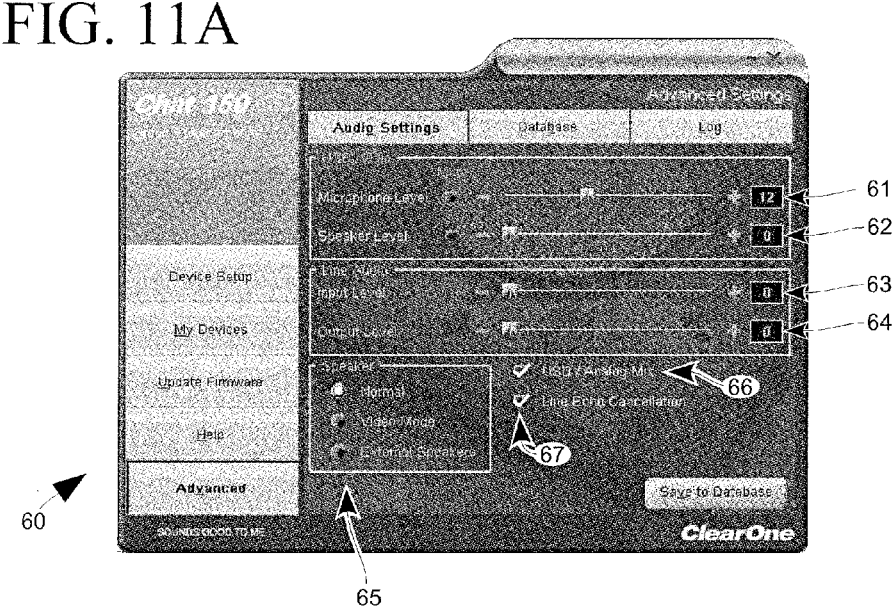
FIG. 11A shows an exemplary configuration screen for a two-port conferencing device.

Continuing to FIG. 11A, the operation of conferencing product 50 is controllable through software, with one exemplary screen 60 shown in that figure. The operation of product 50 is selectable with respect to an adjustment to the audio level of the internal microphone, the volume level to the internal speaker, the level of input audio, the level of output audio, the routing of audio, the external/internal mixing, and line echo cancellation controlled by controls 61, 62, 63, 64, 65, 66 and 67, respectively. More specifically, control 65 sets one of three speaker modes. In normal mode, both the audio from the computer through the USB port and the audio from the external interface through the breakout box are produced at the internal speaker of product 50. In the video mode, the audio from the external interface is blocked, and only the USB-audio is produced at the internal speaker. The external speaker mode routes all audio to the external interface and no sound is produced at the internal speaker. Control 66 permits the mixing of incoming audio from distant parties between the USB interface and external interface.

Figure 11B:
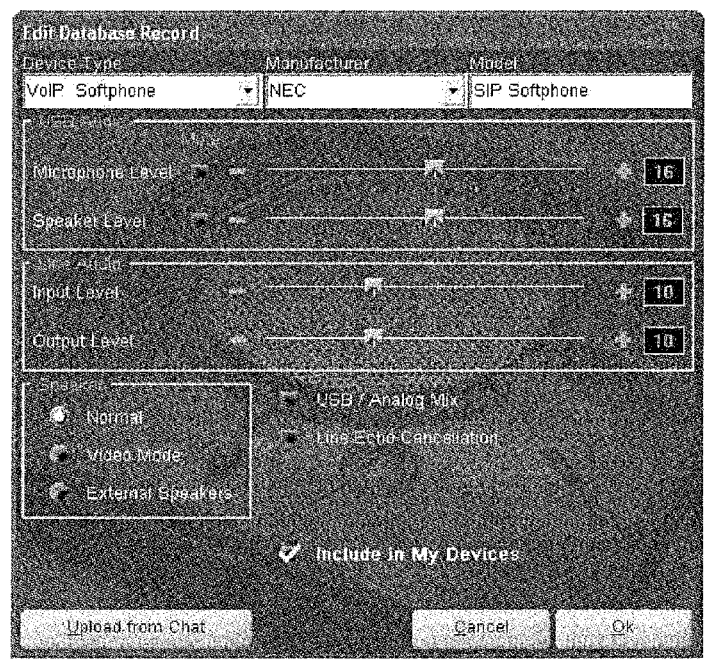
FIG. 11B shows another exemplary configuration screen for a two-port conferencing device having a device selection.

These settings are recordable to a database indexed by an external device (not shown) that can be attached to the external audio interface. Referring to FIG. 11B, such an interface can be indexed by device type, manufacturer and model. These settings may also be provided in a database as sold to the consumer so that an initial setup step may be avoided. For example, if a consumer/user were to connect a particular device to the external audio port of the conferencing product, he or she might enter a screen such as that shown in FIG. 11B and look for a matching device. Upon making a selection, the conferencing product can then be set from the computer with a known good configuration. The user might then adjust various controls, both on the product and in the computer, which could then be saved to the database as an adjustment.

Now although particular systems, functions and methods have been described above, one of ordinary skill in the art will recognize that these are adaptable to related open-air conferencing products and thus the inventions are not limited to the particular implementations described herein. Likewise, although the described functions have been described through the use of block diagrams and in hardware, one of ordinary skill in the art will recognize that most of the functions described herein may be implemented in software as well. Additionally, the exact configurations described herein need not be adhered to, but rather the diagrams and architectures described herein may be varied according to the skill of one of ordinary skill in the art. Moreover, although reference is made to electronics, circuitry and software in the exemplary systems, it is to be recognized that audio functions implemented in electronics/circuitry may often be implemented in software, and vice versa, and thus it is considered within the scope of the invention that software elements might be implemented in electronics with or without a processor executing software, and electronic aspects can likewise be implemented in software.

What is claimed:

1. An open-air conferencing product having a privacy mode, comprising:

a speaker for producing an audio signal;

a microphone for producing a microphone signal responsive to the audio signal;

audio processing electronics;

a first bi-directional port electronically connectable to a first distant party through the audio processing electronics;

a second bi-directional port electronically connectable to a second distant party through the audio processing electronics;

echo cancellation coefficients;

an acoustic echo canceler for receiving the audio signal and a reference audio signal mixed from distant-party signals received from said first and second bi-directional ports and further receiving as input said echo cancellation coefficients, wherein said acoustic echo canceler is operable to apply echo cancellation to the reference audio signal to generate an echo cancelled signal, wherein the portion of the audio signal received at said microphone corresponding to the distant-party signals is attenuated to a privacy level on condition of adaption of said echo cancellation coefficients;

a first audio signal path from said first bi-directional port to said second bi-directional port transferring distant party audio;

a second audio signal path from said second bi-directional port to said first bi-directional port transferring distant party audio;

a first switch whereby said first audio signal path may be interrupted and whereby audio from the first distant party sourced at said first port is not transmitted to said second bi-directional port on condition of adaption of said echo cancellation coefficients; and a second switch whereby said second audio signal path may be interrupted and whereby audio from the second distant party sourced at said second port is not transmitted to said first bi-directional port on condition of adaption of said echo cancellation coefficients;

wherein said audio processing electronics are configurable to transmit the audio received from the first and second distant parties through said first and second bi-directional ports through said speaker;

wherein said audio processing electronics are configurable to transmit to distant parties the microphone signal through said first and second bi-directional ports;

wherein said audio processing electronics are operable to adapt said echo cancellation coefficients to the echo conditions in the environment of said speaker and said microphone under conditions of said speaker and said microphone being active;

wherein if only one of said first and second switches is configured to interrupt its corresponding first or second audio signal path and said acoustic echo canceler is in operation for the environment between said speaker and said microphone, said open-air conferencing product operates in a coaching mode wherein a local participant and the first distant party are provided audio of the second distant party, but audio from the first distant party is not communicated to the second distant party;

wherein if both of said first and second switches is configured to interrupt its corresponding first or second path and said acoustic echo canceler is in operation for the environment between said speaker and said microphone, said open-air conferencing product operates in a mediation mode wherein neither the first or second distant parties are provided audio of the other, but the local participant is provided audio of both the first and second distant parties.

2. The open-air conferencing product according to claim 1, wherein said conferencing product further comprises a user-selectable input whereby said first and second switches may be controlled.

3. The open-air conferencing product according to claim 2, wherein said conferencing product further comprises a computer interface adapted for communication with a computer and said user-selectable input is implemented in software executable from the computer.

4. The open-air conferencing product according to claim 2, wherein said conferencing product further comprises an enclosure housing said microphone and said speaker, wherein said user-selectable input is implemented in a manual control incorporated in said housing.

5. The open-air conferencing product according to claim 1, wherein one of said first and second bi-directional ports is an external audio interface adapted to connect to a device providing a separate communication channel to a distant party.

6. The open-air conferencing product according to claim 5, further comprising routing circuitry operable to perform at least one of the functions of disabling said microphone and routing audio input through said external audio interface and disabling said speaker and routing audio output through said external audio interface.

7. The open-air conferencing product according to claim 6, wherein said acoustic echo canceler is operable to echo cancel the audio provided to said external audio interface and produced at the speaker of a device connected to said interface.

8. A method of operating an open-air conferencing product having a privacy mode, the conferency product comprising a speaker, a microphone, first and second bi-directional ports each electronically connectable to a distant party, audio processing electronics configured to audibly transmit the audio received from distant parties through said first and second bi-directional ports through said speaker and also configured to transmit to distant parties the audio signal received at said microphone through said first and second bi-directional ports, the conferencing product further comprising echo cancellation coefficients, an acoustic echo canceler receiving the audio signal produced by the microphone and a reference audio signal mixed from the distant-party signals received from the first and second bi-directional ports and further receiving as input said echo cancellation coefficients, wherein the portion of the audio signal received at said microphone corresponding to the distant-party signals is attenuated to a privacy level on condition of adaption of said echo cancellation coefficients; said method comprising the steps of:

making a connection through one of the first and second bi-directional ports to a private distant party;

engaging in an audio activity to adapt the echo cancellation coefficients;

configuring the conferencing product into a coaching mode;

following the adaption of the echo cancellation coefficients, making a connection to a non-private distant party through another of the first and second bi-directional ports; and engaging in a conversation with the non-private distant party, wherein both a local participant and the private distant party are provided the audio of the non-private distant party, but the audio from the private distant party is not communicated to the non-private distant party.

9. The method of claim 8, further comprising the steps of:
configuring the open-air conferencing product from coaching mode into full-audio mode; and
engaging in a three-way conversation between a local participant, the private party and the non-private party.

10. The method of claim 8, wherein the step of engaging in an audio activity continues until the private distant party cannot hear himself/herself.

11. A method of operating an open-air conferencing product having a privacy mode, the conferencing product comprising a speaker, a microphone, first and second bi-directional ports each electronically connectable to a distant party, audio processing electronics configured to audibly transmit the audio received from distant parties through said first and second bi-directional ports through said speaker and also configured to transmit to distant parties the audio signal received at said microphone through said first and second bi-directional ports, the conferencing product further comprising echo cancellation coefficients, an acoustic echo canceler receiving the audio signal produced by the microphone and a reference audio signal mixed from the distant-party signals received from the first and second bi-directional ports and further receiving as input said echo cancellation coefficients, wherein the portion of the audio signal received at said microphone corresponding to the distant-party signals is attenuated to a privacy level on condition of adaption of said echo cancellation coefficients; said method comprising the steps of:

- making a first connection through a first bi-directional port to a first distant party;
- engaging in an audio activity to adapt the echo cancellation coefficients;
- configuring the conferencing product into a mediation mode;
- following the adaption of the echo cancellation coefficients, connecting making a second connection to a second distant party through a second bi-directional port; and
- engaging in a conversation with both connected parties, wherein neither of the private distant parties are provided audio of the other, but a local participant is provided audio of both of the private first and second distant parties.

12. The method of claim 11, further comprising the steps of:
- prior to joining a second or later party into a mediative conference, muting the audio to the earlier parties; and
- following joining of the second or later party, unmuting the audio to the earlier parties.

13. The method of claim 12, further comprising the steps of:
- prior to joining a second or later party into a mediative conference, muting the audio to the earlier parties; and
- following joining of the second or later party, unmuting the audio to the earlier parties.

14. The method of claim 13, further comprising the step of engaging in an audio activity with the second or later party until that party cannot hear himself/herself.

15. The method of claim 11, further comprising the steps of:
- configuring the open-air conferencing product from mediation mode into full-audio mode; and
- engaging in a three-way non-private conversation.

16. The method of claim 11, further comprising the steps of:
- configuring the open-air conferencing product from mediation mode into coaching mode; and
- engaging in a conversation with the non-private party.

17. The method of claim 11, wherein the step of engaging in an audio activity continues until the first distant party cannot hear himself/herself.

* * * * *